(No Model.)
A. D. & H. E. GOODELL.
AUTOMATIC SCREW DRIVER.
No. 463,506. Patented Nov. 17, 1891.
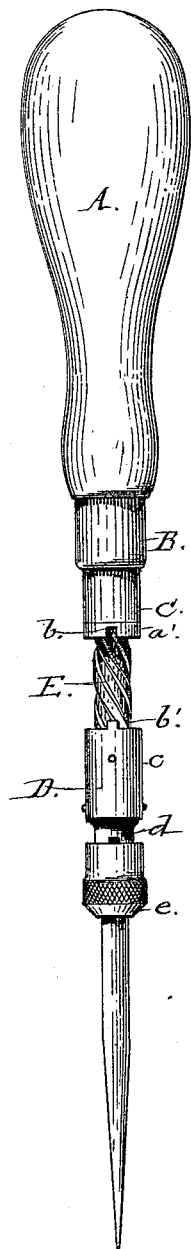
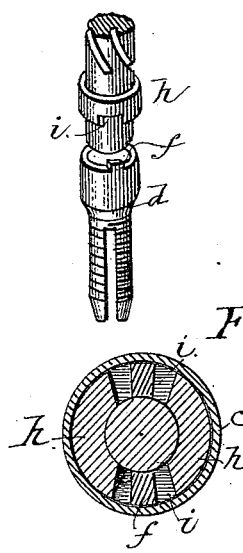
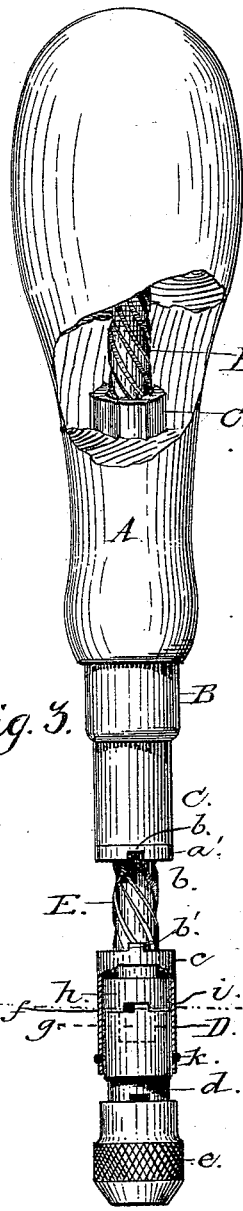
Witnesses:
Elmer James
Florence Morley
Inventors:
A. D. Goodell
H. E. Goodell
per Chas. W. Donnet Co.
Attorneys

UNITED STATES PATENT OFFICE.

ALBERT D. GOODELL AND HENRY E. GOODELL, OF SHELBURNE FALLS, MASSACHUSETTS.

AUTOMATIC SCREW-DRIVER.

SPECIFICATION forming part of Letters Patent No. 463,506, dated November 17, 1891.

Application filed September 10, 1890. Serial No. 364,578. (No model.)

*To all whom it may concern:*

Be it known that we, ALBERT D. GOODELL and HENRY E. GOODELL, citizens of the United States, residing at Shelburne Falls, in the county of Franklin and State of Massachusetts, have invented certain new and useful Improvements in Automatic Screw-Drivers; and we do hereby declare the following to be a full, clear, and exact description of the invention, such as will enable others skilled in the art to which it appertains to make and use the same.

Our present invention relates to an improvement in automatic screw-drivers, and it is a step in advance of a screw-driver patented by us July 22, 1890, No. 432,729. In this invention we use the same simple means for locking the fixed socket and movable socket together in order that the device may be used as an ordinary screw-driver when necessary.

In the drawings illustrating our invention, Figure 1 is an elevation of the screw-driver complete. Fig. 2 is an elevation of the device, partly broken away, to show certain interior arrangements of the movable socket. Fig. 3 is a transverse sectional view of socket B taken on line x x, Fig. 2. Fig. 4 is a perspective view showing the relations of slot i and projection f.

Similar reference-letters indicate like parts in all of the figures.

Referring to the drawings, A is the wooden portion of the handle of the screw-driver.

B is the metal ferrule.

C is the fixed socket, provided with longitudinal ribs on the outside, which take into the wooden portion of the handle and hold the said socket and handle against rotation. On the lower or outside end of the fixed socket C is secured, by brazing or otherwise, a capping a', of steel or other hard metal, which will resist the impact of the two sockets and prevent battering. The capping a' has the angular slot b like the slot of the fixed socket of our previous Patent No. 432,729.

D is the movable socket composed of parts c d, the former having the angular projection b', which corresponds with the slots b of the fixed socket C. The part d of the socket D is conical, split or slotted, and screw-threaded at one end, and within said end are formed longitudinally-opposite grooves, which are not unlike the grooves of the movable socket of our previous patent referred to above to receive one end of the screw-driver bit. The opposite end of the portion d of the movable socket D is cylindrically hollow to receive the cylindrical end g of the grooved spindle, and said portion is provided with angular projections f f, the purpose of which will be hereinafter mentioned.

E is the spirally-grooved spindle adapted to run into corresponding grooves formed in the fixed socket C. The end g of the spindle E is cylindrical, and near its end is fixed a collar h, provided with opposite slots i i, which receive the projection f of the portion d of the movable socket D. The portion c of the movable socket fits snugly, like a jacket, over the portion d of said socket, and the said two parts c d are pinned together with a pin k. When the spindle E and the parts c and d are together, the said part c fits snugly around the neck of the said spindle and a space is formed within the said portion c to serve for longitudinal play to the said spindle a little more than the depth of the slots i of collar h and the corresponding projection f of the portion d of the socket D.

In the operation of the screw-driver when the movable socket is held with the bit downward by gravity the two parts of the movable socket separate a distance sufficient to take the projections f out of the slots i, so that the spindle E may revolve freely and come out of the fixed socket; but as soon as the said fixed socket is pressed downward with the handle in the hands of the operator upon or against a bearing the slots i and projections f engage, and the said movable socket as a whole is revolved to drive a screw.

The screw-driver bit is fitted into the end of the movable socket and kept to place by means of the conical and screw-threaded cap e, in a manner similar to that of our previous patent referred to.

Having thus described our invention, what we claim as new, and desire to secure by Letters Patent, is—

In an automatic screw-driver, the combination, with socket C, provided with capping $a'$, and angular slots $b$, of the socket D, composed of part $c$, of hollow cylindrical form provided with projections $b'$, adapted to engage slots $b$, and part $d$, secured by pin $k$ to part $c$, and having projections $f$, and the grooved spindle having a collar $h$, with slot $i$ adapted to engage with said projections $f$, as specified.

In testimony whereof we affix our signatures in presence of two witnesses.

ALBERT D. GOODELL,
HENRY E. GOODELL.

Witnesses:
A. K. HAWKS,
EDWARD HOWARD.